Dec. 25, 1928.
C. W. MANZEL
1,696,497
LUBRICATING GUN
Filed Nov. 14, 1921
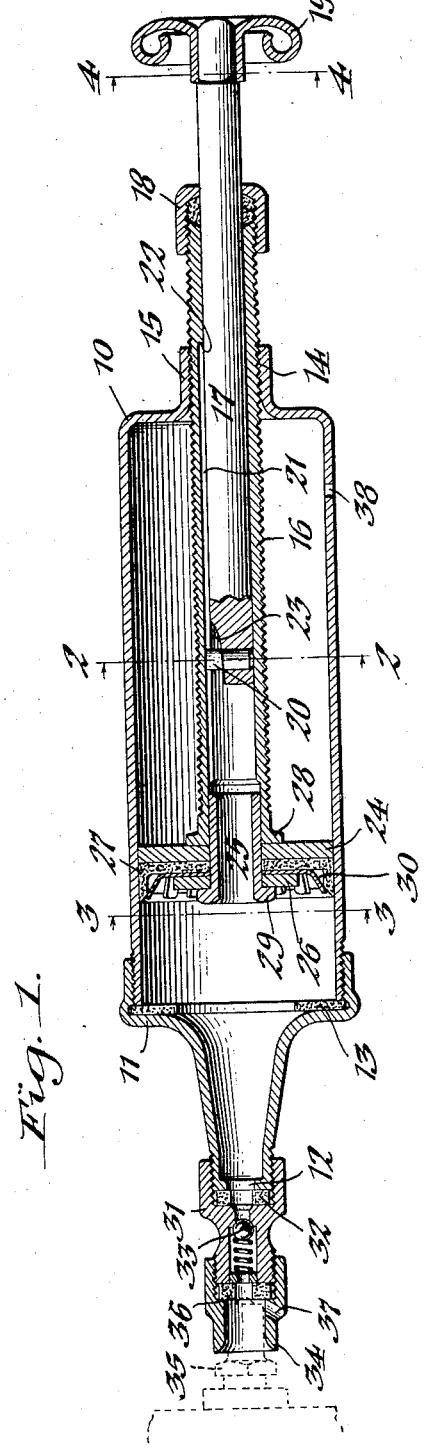
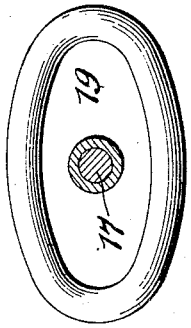
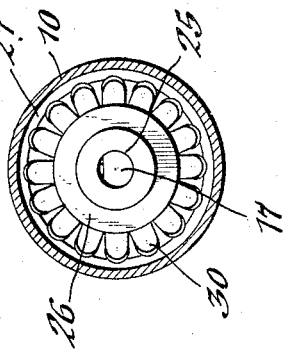
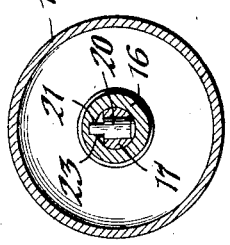
Inventor,
Charles W Manzel
by Geyer & Popp
Attorneys.

Patented Dec. 25, 1928.

1,696,497

UNITED STATES PATENT OFFICE.

CHARLES W. MANZEL, OF BUFFALO, NEW YORK, ASSIGNOR TO ALEMITE MANUFACTURING CORPORATION, OF CHICAGO, ILLINOIS, A CORPORATION OF DELAWARE.

LUBRICATING GUN.

Application filed November 14, 1921. Serial No. 514,922.

This invention relates to a lubricating gun or pump intended more especially for supplying oil or grease to the various bearings of automotive vehicles, although it is equally applicable to the bearings of various other mechanisms.

The principal object of the invention is to provide an improved high-pressure gun of this character for expelling a predetermined amount of lubricant upon a given stroke of the pump plunger.

Further objects are to produce a lubricating gun which is simple and inexpensive in construction and to improve the details of its construction with a view of reducing the number of parts to a minimum.

In the accompanying drawings: Figure 1 is a longitudinal section of the gun, Figures 2, 3 and 4 are transverse sections on the correspondingly numbered lines in Fig. 1.

Similar characters of reference indicate corresponding parts throughout the several views.

The body of the gun consists of a lubricant receiving reservoir or magazine 10 which is preferably cylindrical and provided at its open front end with a removable screw cap 11 having a lubricant discharge passage 12 in its front end. A packing gasket 13 may be arranged between said cap and the corresponding ends of the magazine to prevent the leakage of lubricant between these parts. Extending axially into the magazine and engaging a screw threaded opening 14 in a neck 15 formed at the rear end thereof is an externally threaded pump barrel or cylinder 16 of relatively small diameter compared with that of said magazine. This cylinder is threaded substantially its full length and by turning the same in one direction or the other it can be adjusted lengthwise in the magazine into which its front end opens. Sliding in the cylinder is a plunger 17, its rear end passing through a stuffing box or nut 18 threaded on the extreme end of said cylinder. The external rear portion of this plunger serves as an operating rod and is provided with a convenient knob or handle 19 by which the forward and return strokes of said plunger are effected. The front end of the latter is provided with a coupling device, key or pin 20, one end of which projects beyond the surface of the plunger and engages a keyway 21 formed in the bore of the cylinder 16 and extending lengthwise thereof, as shown in Figs. 1 and 2. By this construction, the plunger is held against turning in its cylinder and the latter is capable of being turned to effect its longitudinal adjustment in the magazine through the medium of the plunger handle 19, thereby eliminating a separate handle for this purpose.

The forward or effective stroke of the plunger is limited by its handle abutting against the nut 18, while its return stroke is limited by the key 20 abutting against a stop shoulder 22 formed at the rear end of the keyway 21.

The front end of the plunger 17 opposite or in line with the keyway of the cylinder 16 is provided with a bypass 23, which opens at its front end into said cylinder and communicates at its rear end with said keyway, as shown in Fig. 1. By this arrangement, any lubricant forced into the keyway during the effective or forward stroke of the plunger, is allowed to be expelled therefrom upon the return stroke of said plunger.

Mounted on the front end of the cylinder and movable lengthwise therewith in the magazine 10 is a piston 24. To permit the cylinder to rotate independently of said piston, the latter is preferably mounted on a sleeve or swivel bearing 25 suitably secured to the front end of the cylinder. Arranged between the front face of the piston and a washer 26 is a cup packing 27 of any appropriate material. These parts are held against longitudinal movement on the swivel bearing 25 and for this purpose are arranged between the two flanges 28, 29, the flange 28 being formed at the front end of the cylinder 16 and the flange 29 being formed at the front end of said swivel bearing, as shown in Fig. 1. A flanged spring washer 30 interposed between the washer 26 and the opposing face of the cup packing normally tends to hold the flanged portion of the latter snugly and tightly against the inner wall of the magazine to insure against leakage of the lubricant past the piston.

The delivery or discharge end of the gun may be of any suitable construction, but as shown in the drawings, the same is preferably provided with a discharge nipple 31 screwed to the front end of the cap 11, a packing washer 32 being interposed between these parts. This nipple contains an outwardly opening spring-pressed check valve 33 which normally prevents the entrance of air and dust and the escape of lubricant from the magazine when the gun is not in use. Screwed or otherwise secured to the nipple is a forwardly-projecting guide nozzle or socket 34 which is adapted to fit over a feed nipple 35 carried by a bearing to be lubricated. This guide nozzle is provided with a packing washer or gasket 36 of leather or other appropriate material to form a reliable lubricant-tight seal between the feed nipple and the guide nozzle of the gun. A relief passage 37 is provided in the side of this nozzle for expelling any grease deposited in the bottom of said nozzle upon the gun being placed in position over the feed nipple 35, thus insuring a tight joint between the latter and the guide nozzle at all times and preventing loss of pressure.

The rear end of the magazine is provided with an air vent 38 to insure the proper working of the pump.

To fill the magazine 10 with a lubricant, such as grease, the discharge nipple 31 is unscrewed from the cap 11, and the piston 24 is then drawn back against the rear end of said magazine, this operation being effected by unscrewing the cylinder 16 through the medium of the plunger handle 19. The cap 11 is then unscrewed from the magazine which is filled with grease by means of a suitable paddle, the air being expelled from the grease through the vent 38, thereby removing any air pockets in the grease as it is forced into said magazine. Having thus filled the magazine to its capacity, the screw cap is applied thereto, after which the magazine is vented to remove any remaining air pockets which might be present in the grease contained therein. This venting is accomplished by turning the cylinder 16 in the proper direction to move its piston 24 forwardly in the magazine, which movement forces the grease into the cap 11, the air being expelled through the passage 12 in the latter. This operation is continued until a solid column of grease is seen to discharge through said passage, after which the discharge nipple 31 and its guide nozzle are applied to the screw cap. The resistance of the check valve 33 is sufficient to withstand the pressure of the grease at this time so as to prevent leakage of the grease past said valve.

In lubricating a bearing, the gun is joined to the bearing nipple 35 by passing its guide nozzle 34 over it, as shown in Fig. 1, the body of the gun serving as a handle for this purpose. After moving the plunger 17 to the rear end of its cylinder, the latter is rotated in a direction to advance the piston 24, this movement forcing the grease from the magazine into the cylinder owing to the difference in areas between the latter and the passage in the discharge nipple controlled by the check valve 33. When the cylinder is filled with grease, which condition can be detected by the increased resistance offered to the turning of the plunger handle 19, the plunger is pushed forwardly and the resulting pressure opens the check valve and the grease is delivered into the bearing, the charge expelled being equal to the amount contained in said cylinder. The pressure exerted against the plunger handle and gun body is transmitted to the packing gasket 36 which is thereby held firmly against the end of the feed nipple, producing a tight and reliable seal between these parts and insuring the delivery of a full charge into the bearing. After expelling the charge, the plunger is drawn back to the limit of its stroke, and the cylinder recharged in the manner previously described.

As the plunger is drawn back after ejecting a charge of lubricant into a bearing, a partial vacuum is created in the cylinder 16, which relieves the compression in the magazine to prevent any leakage of grease past the check valve. To fill another bearing, the plunger handle is rotated to move the piston forwardly in the magazine to recharge the cylinder, after which the gun is grasped by said plunger handle and placed over the feed nipple to be lubricated and the plunger then pushed forwardly to expel a charge of grease into the corresponding bearing.

I claim as my invention:

1. A lubricating gun, comprising a magazine having a discharge passage at one end and a threaded opening at its opposite end, a cylinder extending into said magazine and having an external screw thread engaging said threaded opening, said cylinder being provided in its bore with a keyway, a piston carried by said cylinder and movable therewith in said magazine, a plunger movable in said cylinder and having an operating handle, and a key carried by said plunger and engaging said keyway.

2. A lubricating gun, comprising a magazine having a discharge passage at one end and a threaded opening at its opposite end, a cylinder extending into said magazine and opening into the same and having an external screw thread engaging said threaded opening, said cylinder being provided in its bore with a keyway, a piston carried by said cylinder and movable therewith in said magazine, a plunger movable lengthwise in said cylinder and provided with an operating handle, and a key arranged at the front end of said plunger and engaging said keyway, said plunger being provided with a by-pass communicating at one end with the cylinder and at its other end with said key-way.

3. A lubricating gun comprising a magazine having a discharge passageway at one end and a threaded opening at the other end, an outwardly opening valve for closing said discharge passageway, a spring yieldingly holding said valve in its closed position, a cylinder extending into said magazine and having threaded engagement with said threaded opening, and common means for rotating said cylinder and for opening said valve, said means co-acting with said valve to indicate to the operator when said cylinder is filled and consisting of a handle for the outer end of said cylinder.

4. A lubricating gun comprising a magazine having a discharge passageway at one end and a threaded opening at the other end, an outwardly opening valve for closing said discharge passageway, a spring yieldingly holding said valve in its closed position, a cylinder extending into said magazine and having threaded engagement with said threaded opening, and common means for rotating said cylinder and for opening said valve, said means co-acting with said valve to indicate to the operator when said cylinder is filled.

5. A lubricating gun comprising a magazine having a discharge passage way at one end and a threaded opening at the other end, a valve for closing said discharge passageway, a cylinder extending into said magazine and having threaded engagement with said threaded opening, and common means for rotating said cylinder and for opening said valve, said means co-acting with said valve to indicate to the operator when said cylinder is filled.

6. A lubricating gun comprising a magazine having a discharge passageway, a valve for closing said discharge passageway, a cylinder communicating with said magazine, a plunger in said cylinder, means for establishing a sealed connection between said discharge passageway and a lubricant receiving device, and a single operating handle for actuating said plunger to fill said cylinder, and to discharge lubricant from said cylinder, and for opening said valve and for maintaining a sealed relation between said discharge conduit and said lubricant receiving device.

7. A lubricating gun comprising a magazine for holding a quantity of lubricant, a cylinder communicating with said magazine, means for positively displacing lubricant from said magazine into said cylinder, means for expelling lubricant from said cylinder, means for making sealed contact with a lubricant receiving device, and a single handle for actuating said displacing means, said expelling means and said sealing means.

8. A lubricating gun comprising a magazine, a cylinder communicating with said magazine and movable relatively thereto, means for positively displacing lubricant from said magazine into said cylinder, means for expelling lubricant from said cylinder, a valved discharge device through which the lubricant expelled from said cylinder passes, means for effecting a sealed connection between said discharge device and the lubricant receiving device, and a single handle for actuating said displacing means, said expelling means, said sealing means, and for opening said valve.

9. A portable lubricant compressor comprising a barrel, low pressure and unbiased high pressure compressing means in said barrel, a discharge nozzle having means therein to prevent back flow of lubricant, a single actuating handle and connections between said handle and said compressing means for actuating one compressing means by rotation of said handle and the other by reciprocation of said handle.

CHARLES W. MANZEL.